United States Patent
Di Giorgio et al.

(10) Patent No.: US 7,519,675 B2
(45) Date of Patent: Apr. 14, 2009

(54) METHOD, APPARATUS AND COMMUNICATIONS NETWORK FOR MANAGING ELECTRONIC MAIL SERVICES

(75) Inventors: Vincenzo Di Giorgio, Rio de Janeiro (BR); Domenico Francesco Puntillo, Rio de Janeiro (BR)

(73) Assignee: Telecom Italia S.p.A., Milan (IT)

( * ) Notice: Subject to any disclaimer, the term of this patent is extended or adjusted under 35 U.S.C. 154(b) by 42 days.

(21) Appl. No.: 11/547,646

(22) PCT Filed: Apr. 9, 2004

(86) PCT No.: PCT/IT2004/000203

§ 371 (c)(1),
(2), (4) Date: Oct. 5, 2006

(87) PCT Pub. No.: WO2005/099199

PCT Pub. Date: Oct. 20, 2005

(65) Prior Publication Data

US 2007/0220099 A1    Sep. 20, 2007

(51) Int. Cl.
   G06F 15/16   (2006.01)
   G06F 12/00   (2006.01)
(52) U.S. Cl. .................... 709/206; 709/207
(58) Field of Classification Search ........... 709/206, 709/207
   See application file for complete search history.

(56) References Cited

U.S. PATENT DOCUMENTS

| 5,978,836 | A * | 11/1999 | Ouchi ............ 709/206 |
| 6,170,002 | B1 * | 1/2001 | Ouchi ............ 709/206 |
| 6,279,042 | B1 * | 8/2001 | Ouchi ............ 709/240 |
| 7,409,426 | B2 | 8/2008 | Gill et al. |
| 2004/0033803 | A1 * | 2/2004 | Varonen et al. ..... 455/435.1 |
| 2004/0132429 | A1 | 7/2004 | Gill et al. |
| 2005/0027990 | A1 * | 2/2005 | Ogawa ............ 713/184 |
| 2005/0182837 | A1 * | 8/2005 | Harris et al. ...... 709/226 |

(Continued)

FOREIGN PATENT DOCUMENTS

EP    1 422 899 B1    5/2004

(Continued)

*Primary Examiner*—Zarni Maung
(74) *Attorney, Agent, or Firm*—Finnegan, Henderson, Farabow, Garrett & Dunner, L.L.P.

(57) ABSTRACT

For managing the transmission and/or reception of electronic mail messages by a user connected to a communications network, at least one apparatus is configured in such a way as to request, to another apparatus being part of the communications network, an identifier associated uniquely with the user (for example his telephone number), on the basis of another identifier which the network has assigned to the user in the step of connection to the network (an IP address, for example). For sending an electronic mail message generated by the user, the user identifier obtained from the network can be used by the apparatus configured in this way to automatically fill in a sender field of the message, without the need for the user to enter it himself among the configuration parameters of his mail program. For access to a mailbox made available to the user, the apparatus configured in this way intercepts a mailbox access request made by the user and uses the user identifier obtained from the network as the mailbox access key, without the need for the user to enter this access key himself among the configuration parameters of his mail program.

25 Claims, 2 Drawing Sheets

U.S. PATENT DOCUMENTS

2005/0216602 A1* 9/2005 Armstrong et al. .......... 709/250
2005/0256934 A1* 11/2005 Motoyama ................. 709/208

FOREIGN PATENT DOCUMENTS

| | | |
|---|---|---|
| EP | 1 442 899 | 5/2004 |
| GB | 2 364 489 | 1/2002 |
| WO | WO 99/03238 | 1/1999 |
| WO | WO 99/66746 | 12/1999 |
| WO | WO 02/25890 | 3/2002 |

* cited by examiner

METHOD, APPARATUS AND COMMUNICATIONS NETWORK FOR MANAGING ELECTRONIC MAIL SERVICES

CROSS REFERENCE TO RELATED APPLICATION

This application is a national phase application based on PCT/IT2004/000203, filed Apr. 9, 2004, the content of which is incorporated herein by reference.

BACKGROUND OF THE INVENTION

1. Field of the Invention

The present invention relates to a method, to an apparatus and to a communications network adapted for managing electronic mail services. In particular, the present invention relates to a method, to an apparatus and to a communications network adapted for managing the sending of electronic mail messages generated by a user, for example a user having a cellular telephone. The present invention also relates, in particular, to a method, to an apparatus and to a communications network adapted for managing access to an electronic mailbox by a user, for example a user having a cellular telephone.

2. Description of the Related Art

Electronic mail is a system by means of which a user can exchange messages with another user by using a computer, via a communications network.

The use of electronic mail for exchanging messages between users of a packet network, particularly the Internet, is becoming more and more popular, owing to the great ease of use, the greater speed of message delivery (by comparison with the normal transmission of hard copy), the low cost of transmission, especially in the case of users living at great distances from each other, such as users living in different countries (by comparison with the cost of a telephone call), the possibility of attaching files of any type, such as pictures, video clips, texts, etc., to the messages to be transmitted.

Relatively recently, it has also become possible for electronic mail messages to be transmitted and received by users of mobile networks, who can use suitable client software programs installed in some cellular telephones (known as "smartphones", such as the model known as BlackBerry®) to manage their electronic mailboxes as if they were connected to their own home or office personal computer. In second-generation mobile networks, such as a GSM network, these cellular telephones can connect to a packet network, such as the Internet, typically via a GPRS (General Packet Radio Service) connection. Third-generation mobile networks such as UMTS (Universal Mobile Telecommunications Services) can also provide packet services. Both of these systems are therefore capable of providing an electronic mail service to users having suitable cellular telephones.

Typically, messages sent from a sender's terminal (for example a computer or a cellular telephone) pass through one or more intermediate servers until the message is delivered to the recipient's mailbox. In an IP (Internet Protocol) environment, messages are normally transferred from the sender to the recipient by a mechanism controlled by the SMTP (Simple Mail Transfer Protocol) protocol. According to this protocol, as a result of a request to send a message made by the sender of the said message, the sender's SMTP server establishes a communications channel to a destination SMTP server, which can be the recipient's SMTP server or an intermediate SMTP server. In the latter case, the intermediate SMTP server acts as a new sending SMTP server, and the procedure is repeated until the recipient's SMTP server is reached. When the message has reached the recipient's SMTP server, it is delivered to the recipient's mailbox. The mechanism for the access to the messages present in the mailbox is typically controlled, in an IP environment, by the POP (Post Office Protocol), which typically requires the recipient to access his mailbox by means of an access key, for example a combination of a user name and password, to enable the received messages to be downloaded to his terminal.

The information transmitted by an electronic mail message is primarily divided into two portions: a first part, called the header, comprises the sender's address and the address of the recipient (or recipients); a second portion, known as the body, contains the actual message. Typically, the header portion of a received message also comprises a list of the SMTP servers through which the message has passed.

The patent application WO 99/03238 relates to a method, a system and a mail server. The method comprises the following steps: contacting an electronic mail service provider and then starting a client program to communicate with the electronic mail service. The user creates a message, determines the destination of the message and sends the message. The message is received at the server of the mail service, which requests from an exchange information relating to the user's telephone number corresponding to the user's IP address, adds the information relating to the telephone number to the header portion of the message reserved for the list of SMTP servers through which the message has passed, and sends the message towards the destination. According to the description of patent application WO 99/03238, this enables the sender of the message to be identified more precisely, particularly when the transmitted message contains "illegal" or "prohibited" information, or when it contains information which may cause the recipient's mailbox to be blocked, or when it may be convenient to contact the sender to request further information.

The configuration of the software program on the user terminal adapted for the use of mail services (message transmission and reception) is typically such that the user has to enter data relating to the address of the mail server or servers (for example, an SMTP server for transmission and a POP server for reception of messages), data relating to his mailbox access key (for example, a log-in and password), data relating to the mail address to be included in the sender field of the outgoing messages. These data are generally supplied to the user by the electronic mail service provider, but the user must provide by himself to the configuration of the program on the terminal. Where an electronic mail service is used by means of a cellular telephone, the configuration of the program also requires the entry of data relating to the packet connection, for example GPRS or UMTS.

To assist less expert users in the configuration of the program on the terminal, the electronic mail service provider generally provides instructions, which for example can be included in an Internet web page, in a paper manual or on software supports such as diskettes or CD-ROMs. In the case of access to electronic mail services by means of a cellular telephone, part of the configuration of the telephone can be carried out by pre-loading certain data into the telephone software or on to the SIM (Subscriber Identity Module) associated with the telephone, or by means of self-configuring SMS (Short Message Service) messages, or by means of procedures downloadable from the Internet, to be transferred to the cellular telephone by a PC-cellular telephone connection, such as a serial, Bluetooth or IRDA (Infra Red Digital Association) connection.

However, all the above procedures for facilitating configuration only assist the users in the configuration of data which are identical for all subscribers of a service provided by a single provider (such as the data relating to the mail server addresses), while they do not permit the self-configuration of the data relating to the access key to the user's mailbox, or to the user's mail address to be included as the address of the sender of the outgoing messages: this is due to the fact that these data vary from one user to another user. Moreover, the procedures or manuals made available by the providers frequently contain technical terms which are not easily understood by non-expert users (such as the terms "server", "username", "login", or the abbreviations SMTP or POP).

The Applicant has observed that there is a considerable proportion of the population, consisting of non-expert persons, which has difficulty in accessing electronic mail because of incorrect configuration of the electronic mail management program on the user's terminal. In some cases, these users are simply unaware of the fact that the terminal has to be configured, and, on finding that the program fails to work, they dispense with the use of the service. In other cases, the technical terminology of the configuration manual can form a real "psychological barrier", as a result of which the user avoids using the service because he considers it too complicated.

The Applicant has also observed that this kind of problem particularly affects users of mobile networks. This is because these users are generally accustomed to using the cellular telephone for the ordinary telephone service. For these users, it is entirely normal to have a terminal (the cellular telephone) which is "ready for use", without requiring more or less complex configuration procedures. The Applicant has also observed that one of the factors in the considerable success of the messaging services which have now become commonplace in mobile networks, such as SMS transmission or reception, has been the fact that the user has no need to configure anything on his mobile terminal in order to be able to use it.

The Applicant has tackled the problem of further facilitating access to electronic mail services, even for non-expert users. In particular, the Applicant has tackled the problem of providing an electronic mail service (comprising transmission and/or reception of messages) in which no configuration of the terminal is necessarily required to the user.

The Applicant has found that this problem can be solved by having the transmission and/or reception of electronic mail messages managed by at least one apparatus configured in such a way as to request, from another apparatus being part of the communications network to which a user is connected, an identifier associated uniquely with the user (for example his telephone number, or a string—so called an "alias"—associated uniquely with the user), on the basis of another identifier which the network has assigned to the user in the step of connection to the network (for example an IP address, or a host name), or which the said network is capable of associating uniquely with the user to enable them to access the network services (for example an IMSI [International Mobile Subscriber Identifier] stored in a SIM associated with the user terminal).

To enable an electronic mail message generated by the user to be sent, the user identifier obtained from the network can be used by the apparatus configured as stated above to automatically complete a message sender field, without the need for the user to enter it by himself among the configuration parameters. For access to a mailbox made available to the user by the provider, the apparatus configured as stated above intercepts a request for access to the mailbox by the user and uses the user identifier obtained from the network as the access key to the mailbox, without the need for the user to enter this access key by himself among the configuration parameters.

To be able to use an electronic mail service, a user can have, in practice as single configuration parameter, the address of the apparatus programmed as described above, in other words a fixed parameter, which is identical for all users of the service. This address can be loaded into the mail program resident in the user terminal by simple automatic configuration procedures. For example, if the electronic mail service is used from a personal computer, the address of the apparatus can be included in the configuration of the mail program by a self-configuration program made available by the service provider on a support such as a diskette or CD-ROM, or downloadable from the Internet. If the electronic mail service is used from a cellular telephone, the address of the apparatus can be included in the configuration by pre-loading on to the SIM or on to the telephone acquired by the user, or by over-the-air updating, by means of a self-configuring SMS for example.

SUMMARY OF THE INVENTION

In accordance with a first aspect, the invention relates to a method for sending an electronic mail message in a communications network, the message including a header and a body, said header having at least a first field adapted for containing an address of a sender of the message, and a second field adapted for containing an address of a recipient of the message, the sender being a user identified in the communications network by means of a first identifier associated with a least a second identifier, the header further including a third field containing the first identifier of the user. This method comprises the steps of:

selecting the first identifier of the user from the third field of the header;
  requesting the second identifier associated with the first identifier to at least one apparatus of the communications network;
  including the second identifier in the header of the message; and
  forwarding the message to the recipient,
  wherein the step of including the second identifier in the header includes the second identifier in the first field.

In a second aspect, the invention relates to a method of sending a request for access to an electronic mailbox by a user of a communications network, the user being identified in the communications network by means of a first identifier associated with at least a second identifier, the request including at least a first field for containing an access key to the mailbox and a second field containing the first identifier of the user.

This method includes the steps of:
  selecting the first identifier of the user from the second field;
  requesting the second identifier associated with the first identifier to at least one apparatus of the communications network;
  including the second identifier in the first field; and
  forwarding the request for access to the electronic mailbox, using the second identifier included in the first field.

In a third aspect, the invention relates to a software program adapted for loading into a memory of a computer, which includes software code portions which are capable of being adapted to execute the steps of the method of the present invention as discussed above, and to a software product which includes a medium accessible by a memory of a computer, on which the software program is stored.

In another aspect, the invention relates to an apparatus for sending an electronic mail message in a communications network, wherein the message includes a header and a body. The header includes at least a first field adapted for containing an address of a sender of the message, and a second field adapted for containing an address of a recipient of the message, the sender being a user identified in the communications network by means of a first identifier associated with at least a second identifier, the header additionally including a third field, containing the first identifier of the user. The apparatus is adapted for:

selecting the first identifier of the user from the third field of the header;

requesting the second identifier associated with the first identifier to at least one further apparatus of the communications network;

including the second identifier in the header of the message;

forwarding the message to the recipient; and including the second identifier in the first field.

In still another aspect, the invention relates to an apparatus for forwarding a request for access to an electronic mailbox from a user of a communications network, the user being identified in the communications network by means of a first identifier associated with at least a second identifier, the request comprising at least a first field for containing an access key to the mailbox and a second field containing the first identifier of the user, the apparatus being adapted for:

selecting the first identifier of the user from the second field;

requesting the second identifier associated with the first identifier to at least one further apparatus of the communications network;

including the second identifier in the first field; and forwarding the request for access to the electronic mailbox, using the second identifier included in the first field.

In another aspect of the present invention, there is provided a communications network including a first apparatus as discussed above operatively connected to at least a further apparatus on which at least one table is resident which includes the first identifier associated with the second identifier of the user.

BRIEF DESCRIPTION OF THE DRAWINGS

Further features and advantages of the present invention will be made clearer by the following detailed description of some examples thereof, provided purely by way of example and without restrictive intent. The detailed description will refer to the following figures, in which.

DETAILED DESCRIPTION OF THE INVENTION

Figure 1:
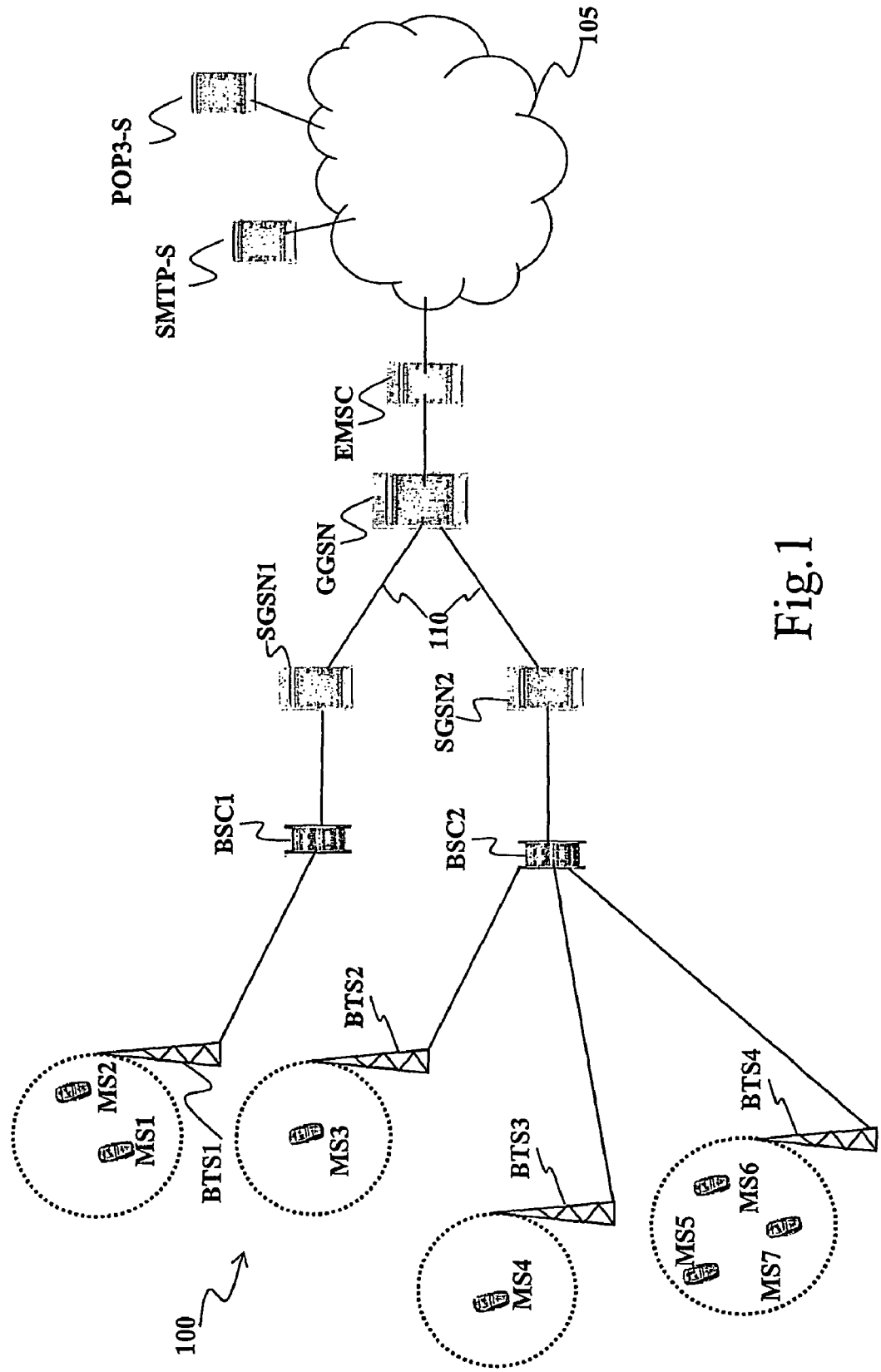
FIG. 1 schematically shows a mobile network for providing electronic mail services, according to an aspect of the present invention.

With reference to FIG. 1, a mobile network 100, particularly a GSM cellular telephone network, comprises a plurality of base station subsystems (BSS), each capable of providing coverage for cellular telephone communications in a corresponding geographic region. Typically, a BSS comprises a plurality of base transceiver stations (BTS), each capable of providing coverage in a corresponding "cell", in other words a portion of the geographic region covered by the BSS; the number of BTSs in a BSS can be rather high in practice, but for simplicity only four BTSs, namely BTS1, BTS2, BTS3 and BTS4, have been shown in FIG. 1, in the form of corresponding antennae. The corresponding cells CELL1, CELL2, CELL3 and CELL4 have been represented as circles in broken lines, although the exact geometrical shape of the cells can be in practice very different.

In general, a BTS of the network of a mobile network operator communicates with the mobile terminals (cellular telephones, for example) of the users subscribers of this operator located within the corresponding cell, for example the mobile terminals MS1 and MS2 within CELL1 (served by BTS1), the mobile terminal MS3 within CELL2 (served by BTS2), the mobile terminal MS4 within CELL3 (served by BTS3), the mobile terminals MS5, MS6, MS7 within CELL4 (served by BTS4). The mobile terminals MS1, . . . MS7 are typically associated with corresponding SIMs, made available by the operator providing the cellular telephone service in the network 100.

Typically, a plurality of BTSs is connected to a single base station controller (BSC), for example the BSC BSC1, to which the BTS BTS1 is connected, and the BSC BSC2, to which the BTSs BTS2, BTS3 and BTS4 are connected. In practice, the BTSs manage the transmission/reception of signals to/from the mobile terminals, while the BSCs instruct the various BTSs about which data are to be transmitted on specific radio communication channels, and carry out at least some of the operations required for authenticating the mobile terminals in the network 100.

As is known, BSCs belonging to different BSSs, such as the BSCs BSC1 and BSC2, can typically be connected to a single Mobile Switching Centre (MSC), not shown in FIG. 1. The MSC is involved in the step of authenticating the mobile terminals, and acts as a gateway between the communications network 100 and other communications networks, such as fixed networks (PSTN) or other mobile communications networks (PLMN). The MSC operates on the basis of information obtained from a home location register (HLR), not shown in FIG. 1, which stores the data of the different subscribers of the services which the operator of the network 100 makes available (in particular, the telephone numbers of the users, associated with a unique identifier for each user, called the international mobile subscriber identifier, or IMSI, an identical copy of which is also stored in the user's SIM), typically organized in so called "user profiles". The MSC also operates on the basis of one or more visitor location registers (VLR), not shown in FIG. 1, adapted to contain information on the current positions of the various mobile terminals of the users connected to the network 100.

FIG. 1 also shows, in a schematic way, some network apparatus which, according to the GPRS standard, enable users' mobile terminals to be connected to a packet network, indicated by the numerical reference 105 in FIG. 1, typically based on the IP protocol, for example the Internet or a company's Intranet. One of these network apparatus is a GPRS gateway support node (GGSN) GGSN, adapted to operate as an interface between the mobile network 100 and the packet network 105. The GGSN GGSN exchanges packets of data, through a GPRS backbone network 110, with one or more serving GPRS support nodes (SGSN), such as the SGSNs SGSN1 and SGSN2 shown in FIG. 1. In general, an SGSN is associated with one or more BSSs, and sends the data packets received through the GGSN and the GPRS backbone network, from the packet network servers to the mobile terminals which have requested them, located in the geographic region covered by the corresponding BSS. For example, the SGSN SGSN1 sends the data packets received, through the GGSN GGSN and the GPRS backbone network 110, from the packet network 105 to the mobile terminals MS1 and/or MS2.

In particular, using information contained in the VLR, the SGSN keeps track of the geographic positions of the mobile terminals connected to the network 100 (particularly those which have a GPRS connection active), in such a way that it knows the BSCs and BTSs to which the data packets addressed to the mobile terminals are to be sent. In other words, the SGSN determines which cell the recipient mobile terminal is located in, and sends the data to this cell. A single SGSN can communicate with a plurality of GGSN, to receive data obtained from different packet networks or sub-networks.

To provide communication services based on packet transmission, a BSC is associated with a corresponding packet control unit (PCU), not shown explicitly in FIG. 1, but normally included in the BSC. The PCU operates as an interface between the BSC and the packet network apparatus. In other words, the PCU converts the data packets received from the SGSN connected to the BSC with which it is associated, and directed towards a particular mobile terminal, in data flows which can be transmitted "over the air", from one of the BTSs, using the radio resources of the mobile network; additionally, the PCU converts data flows transmitted by the mobile terminals and received by the BTSs into data packets which can be transmitted towards the apparatus of the GPRS network, particularly towards the GGSN.

FIG. 1 also shows a server SMTP-S suitable for transmitting electronic mail messages originated by the mobile terminals of the network 100, for example an SMTP server, and a server POP3-S, suitable for storing mailboxes associated with the users owning the mobile terminals of the network 100, accessible for example by means of requests based on the POP3 protocol. The servers SMTP-S and POP3-S can be made available by the operator providing the cellular communication services offered through the network 100, or can be made available by an external provider. They are connected to the packet network 105, as shown in FIG. 1. Although in FIG. 1 the two servers are shown as resident in different hardware apparatus, in practice they can also be resident in the same hardware apparatus.

According to an aspect of the invention, the network 100 also comprises a further network apparatus, identified by the reference EMSC, adapted for managing the electronic mail service requested by the mobile terminals connected to the network 100, as it will be described below. The network apparatus is identified in the remainder of the description by the expression "e-mail service centre", or EMSC. In general, the EMSC EMSC acts as an interface between the mobile terminals connected to the network 100 and the SMTP-S and POP3-S servers; in other words, it "captures" and manages the requests relating to electronic mail services originated by the mobile terminals, particularly the electronic mail messages to be sent by the SMTP-S server and the requests for access to the mailboxes resident on the POP3-S server. As explained below, the inclusion of the EMSC EMSC in the mobile network 100 enables users owning the mobile terminals connected to the mobile network 100 to use electronic mail services, by means of the GPRS portion of the network (in other words the PCU, SGSN and GGSN), without the need to configure his own mobile terminal with the typical identification parameters of electronic mail services, such as his own electronic mail address and his own access key (typically a user name and a password) to his electronic mailbox.

A network address, typically associated with a host name which can be made available to the various mobile terminals MS1, . . . MS7 by known methods, is assigned to the EMSC EMSC. For example the host name of the EMSC EMSC can be stored in the memory of the SIMs or of the mobile terminals configured for use in the network 100 sold in the appropriate shops, or by over-the-air updating (for example via SMS with self-configuration commands). Since the address in question is a fixed address (or host name) for all the subscribers of the operator managing the network 100, it does not require configuration by the users.

Figure 2:
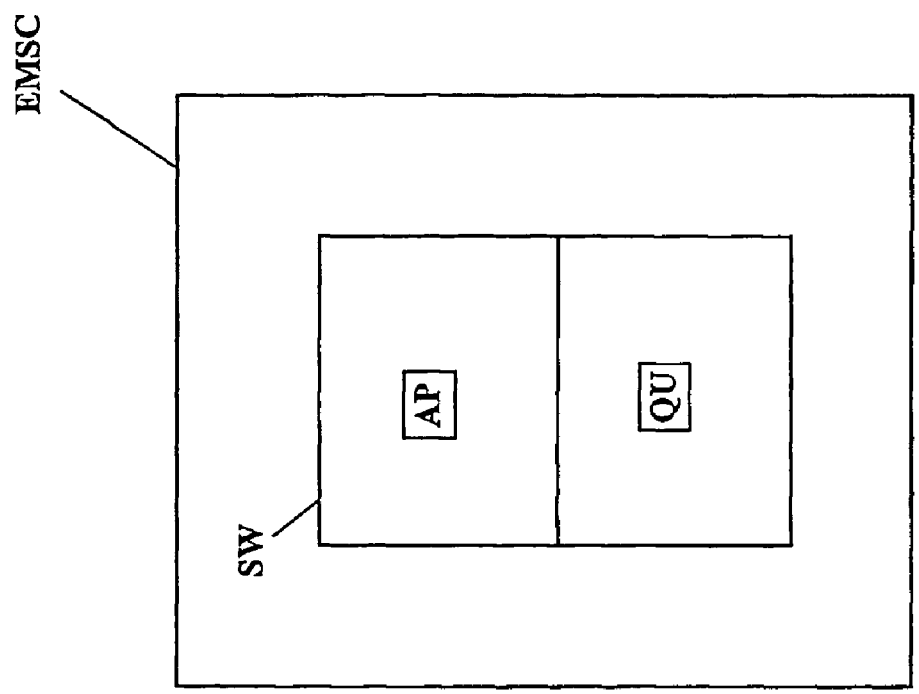
FIG. 2 schematically shows a preferred embodiment of an apparatus for managing electronic mail services, according to another aspect of the present invention.

FIG. 2 shows schematically a preferred embodiment of an EMSC EMSC. The EMSC EMSC comprises a process associated with a memory in which resides a software SW whose functions can be divided schematically into two parts, namely a first part AP, called the application part, and a second part QU, called the query part. The first part AP is adapted to receive the electronic mail service requests originated by the users, to discriminate from these requests a first identifier assigned by the network 100 (see FIG. 1) to the user originating the request, and to include in the request originated by the user a second identifier associated with this user, made available by the second part QU. The second part QU is adapted to receive the aforesaid first identifier from the first part AP, to query at least one apparatus of the network 100 to obtain the second identifier of the user associated with the first identifier, and to make this second identifier available to the first part AP. The first identifier associated with the mobile terminal which is making the request can be, for example, a network address assigned to the mobile terminal (for example an IP address). The network apparatus interrogated by the software portion QU can be a GGSN of the mobile network 100. The second identifier associated with the user can be the telephone number of the mobile terminal 100.

A preferred procedure for the operation of the network 100 comprising the EMSC EMSC of FIGS. 1 and 2 will now be described in detail, for the case of the sending of an electronic mail message by one of the mobile terminals connected to the network 100, for example the mobile terminal MS1. A prerequisite for the sending of the mail message is the authentication of the mobile terminal MS1 in the mobile network 100. This authentication can be carried out by completely standard procedures. Typically, the mobile terminal MS1 is associated with a SIM in which resides an identifier uniquely associated with the user, called the IMSI (International Mobile Subscriber Identifier), which is sent towards the network apparatus (MSC and HLR), to allow the authentication of the user in the network 100. In particular, the so called "user profile" associated with the user owning the mobile terminal MS1 (or, more generally, owning the SIM associated with the mobile terminal MS1), in other words associated with an identical copy of the user's IMSI, is resident in the HLR. Typically, this profile comprises the user's telephone number. Preferably, this profile also comprises an "alias" uniquely associated with the user (for example a string of the type forename.surname, where "forename" and "surname" correspond to the user's forename and surname), which can be used for the electronic mail services as described below.

The mobile terminal MS1 contains a resident software program adapted for sending electronic mail messages, in other words adapted for filling in a field reserved for the recipient or recipients of the message, and for filling in a body which can typically comprise text and/or attachments of various kinds such as images, video clips or audio files. Typically, an address book, also resident in the mobile terminal MS1, comprises the addresses of the usual recipients of the messages originated by the owner of the mobile terminal MS1, and can be associated with the field reserved for the recipient, in such a way as to facilitate the addressing of the messages. The mobile terminal MS1 is also configured in such a way that the requests relating to the electronic mail services, such as the sending of a message, are sent to the EMSC EMSC. In other words, the address or, preferably, the host name of the EMSC EMSC is included among the configuration parameters of the electronic mail software program. A "dummy" electronic mail address of the user (in other words a string), preferably identical for all subscribers to the mobile network 100 (or to the electronic mail service provided by the operator controlling the mobile network 100), may be also comprised among the configuration parameters included in the mobile terminal MS1. This "dummy" address can be included in a field designed to contain the address of the message sender.

Having created the mail message, the user sends the message. If not already active, a GPRS connection is activated, since the electronic mail service requires data transmission of the packet type (typically according to the SMTP protocol). The GPRS connection can be activated in a completely standard way. A network address (typically an IP address) is assigned to the mobile terminal MS1 to identify the said terminal MS1 in the GPRS portion of the network 100. The terminal MS1 is already recognized by the network 100 by means of another identifier, i.e. the telephone number associated with the said terminal MS1. Typically, the GGSN GGSN of the network 100 contains a resident table in which an association is made between the telephone number of the user (in other words associated with his terminal MS1) who is requesting the GPRS service and the IP address assigned to the terminal MS1. The terminal MS1 is configured in such a way that the electronic mail services are managed by the EMSC EMSC, so that the message is sent to this EMSC apparatus.

In the EMSC EMSC, the application part AP of the resident software discriminates from the message the IP address assigned to the sender's mobile terminal MS1. The IP address is sent to the query part QU, which opens a connection towards the GGSN GGSN. In this connection, the IP address of the mobile terminal MS1 is sent to the GGSN GGSN to request the telephone number associated with the terminal MS1, corresponding to this IP address. The GGSN GGSN replies to this request by sending to the EMSC EMSC the telephone number associated with the terminal MS1. The query part QU of the software of the EMSC EMSC collects the telephone number sent by the GGSN GGSN and forwards it to the application part AP of the software. The latter reconstructs an electronic mail address, using the telephone number (A-number) collected in this way, for example by constructing a string of the type "A-number@domain", and uses this reconstructed electronic mail address to update the sender field of the message which had been sent by the mobile terminal MS1. For this purpose, the application part AP replaces the string corresponding to the "dummy" address entered by the mobile terminal MS1 with the address reconstructed as a result of the request for the A-number sent to the GGSN GGSN. After the updating of the sender field, the application part AP forwards the message to the electronic mail message sending server SMTP-S, to enable the message to be sent via the network 105 to the recipient (or recipients).

The procedure described above enables a user to send a message without having to pre-configure his cellular telephone with his electronic mail address. This advantageously enables the user to have a service which is "ready for use". In the case described, the electronic mail address associated with the user is the string "A-number@domain". It should be noted that electronic mail addresses of this type are typically assigned to mobile network users. In any case, a different procedure may require a second connection, this time from the EMSC EMSC to the HLR of the network 100, in which a request is made for an alias associated, in the user profile, with the telephone number of the mobile terminal MS1, previously obtained from the first connection towards the GGSN GGSN, as described above. This alias (for example, a string of the forename.surname type) can be used by the application portion AP of the EMSC software to reconstruct the user's electronic mail address to be updated in the sender field of the message to be sent. In another procedure differing from that described above, the IMSI associated with the user of the mobile terminal MS1 can be sent from the mobile terminal MS1, together with the electronic mail message (in a field of the message provided ad hoc, for example). By using the IMSI, the EMSC EMSC can open a connection directly to the HLR of the network 100, to obtain from it the user's telephone number or his alias.

The EMSC server EMSC (or the application portion of the software AP) can be configured in such a way that a first electronic mail message sent by a user triggers the creation of a mailbox associated with the user (in the POP3-S mail server), in such a way as to provide a number of mailboxes corresponding to the actual usage of the mobile network 100 by the users.

A detailed description will now be given of a preferred operating procedure of the network 100 comprising the EMSC EMSC of FIGS. 1 and 2, in the case in which a user owning a mobile terminal connected to the network 100, for example the mobile terminal MS1, is checking his electronic mailbox in the POP3-S server. A prerequisite for the mailbox access request is the authentication of the mobile terminal MS1 in the mobile network 100, which can be carried out in an entirely standard way as described previously.

The mailbox resident on the POP3-S mail server can be accessed by means of an access request comprising an access key, for example formed by a user name and a password. Typically, the user name for accessing the user's mailbox corresponds to the string preceding the character "@" of the address associated with the user. In the case of the present invention, as stated above, the mailbox can therefore be accessed by means of an access key corresponding to the user's telephone number (A-number), or by means of an alias uniquely associated with the user, typically included in the user profile resident in the HLR of the mobile network 100, as described above. Preferably, the access mechanism can require the entry of a single parameter (username=A-number, or username=alias) for access to the mailbox. Alternatively, the access mechanism can require the entry of a username=password pair (username=password=A-number, or username=password=alias).

The software program resident in the mobile terminal MS1, adapted for sending electronic mail messages, enables the user to access his mailbox and to download to the mobile terminal MS1 the messages arriving there from the network 105. Clearly, these functions can also be performed by a separate program. The mobile terminal MS1 is also configured in such a way that the requests relating to the electronic mail services, such as the request for access to the user's mailbox, are sent towards the EMSC EMSC. In other words, the address or, preferably, the host name of the EMSC EMSC is included among the configuration parameters of the electronic mail software program which controls the access request. A "dummy" user name (and, if necessary, a "dummy" password, in other words, a string) can also be entered among the configuration parameters included in the mobile terminal MS1 for access to the user's mailbox, preferably being identical for all the subscribers of the mobile network 100 (or of the electronic mail service provided by the operator managing the mobile network 100). This "dummy" username (and password, if necessary) can be included as the access key in the request for access to the electronic mailbox sent by the mobile terminal MS1. The access request can be sent by the mobile terminal MS1 by standard procedures, for example according to the POP3 protocol.

The user can send the request for access to his mailbox by selecting, for example, an option made available on the display of the mobile terminal MS1. If not already active, a GPRS connection is activated, since the mailbox access service requires data transmission of the packet type. The GPRS connection can be activated in a completely standard way. As previously described, a network address (typically an IP address) is assigned to the mobile terminal MS1 to identify the said terminal MS1 in the GPRS portion of the network 100. The terminal MS1 is also already recognized by the network 100 by means of another identifier, in other words the telephone number associated with the said terminal MS1. Typically, the GGSN GGSN of the network 100 contains a resident table in which an association is made between the telephone number of the user (in other words associated with his terminal MS1) who is requesting the GPRS service and the IP address assigned to the terminal MS1. The terminal MS1 is configured in such a way that the electronic mail services are managed by the EMSC EMSC, so that the request for access to the mailbox is sent to this EMSC apparatus.

In the EMSC EMSC, the application part AP of the resident software discriminates from the access request the IP address assigned to the requesting mobile terminal MS1. The IP address is sent to the query part QU, which opens a connection towards the GGSN GGSN. In this connection, the IP address of the mobile terminal MS1 is sent to the GGSN GGSN to request the telephone number associated with the terminal MS1, corresponding to this IP address. The GGSN GGSN replies to this request by sending to the EMSC EMSC the telephone number associated with the terminal MS1. The query part QU of the software of the EMSC EMSC collects the telephone number sent by the GGSN GGSN and forwards it to the application part AP of the software. The latter reconstructs an access key to the electronic mailbox uniquely associated with the user, using the telephone number (A-number) collected in this way, according to what is specified in the access mechanism established in the POP3-S mail server. For example, if it is specified that a user name is all that needs to be sent as access key, the EMSC EMSC substitutes the A-number thus obtained in the user name parameter of the access request. In other words, the EMSC EMSC updates, with the reconstructed access key, the mailbox access request which was sent by the mobile terminal MS1. After this updating of the access request, the application part AP forwards it to the POP3-S server in which the users' mailboxes reside, which authorizes access to the electronic mailbox and allows the downloading of the messages contained therein. The above is also true where the mailbox access key contained in the POP3-S server corresponds to an alias uniquely assigned to the user. As previously described, an query to the HLR of the network 100 can enable the EMSC EMSC to obtain this alias and to reconstruct the access key correctly. It is also possible to use a procedure in which the IMSI associated uniquely with the user is used as the identifier of the user in place of the IP address in the mailbox access request, with the EMSC EMSC requesting the telephone number and/or the alias associated with this IMSI from the HLR, as previously described.

The procedure described above enables a user to check his electronic mailbox without having to pre-configure his cellular telephone with his access parameters (user name and/or password). This advantageously enables the user to have a service which is "ready for use". To maintain an adequate level of confidentiality, an anti-intrusion server (for example a firewall) can be connected between the POP3-S server and the packet network 105, particularly if the network 105 is the Internet. The firewall can be configured, for example, in such a way as to permit the arrival of mail messages from the network 105, to permit the passage of the access requests from the EMSC EMSC, and to block mailbox access requests not originating from the mobile network 100 or, more particularly, from the EMSC EMSC.

Even though the present invention has been described with reference to specific procedures and to a GPRS mobile network, as well as with explicit mention of typical identifiers of a mobile terminal connected to a mobile network, various modifications can be made to adapt the teachings of the present invention to different contexts. For example, procedures similar to those described above can be implemented in a mobile network of the E-GPRS (enhanced GPRS) type, also known as EDGE (Enhanced Data rates for Global Evolution), which uses a different modulation from that used in conventional GSM/GPRS mobile networks, to increase the bit rate of the radio transmission. Additionally, procedures similar to those described above can also be implemented in third-generation mobile networks, such as mobile networks according to the UMTS standard.

Furthermore, similar procedures can also be implemented in a fixed network context, and not only in mobile networks. In a fixed network context, the users of an electronic mail service implemented as described above can access a packet network by means of a personal computer, in place of a mobile terminal such as a cellular telephone, the computer being connected to the Internet (or to another generic packet network) by dial-up access, for example with a conventional modem, or of the ISDN or ADSL type, for access to the electronic mail services. A server carrying out the functions of the EMSC server described above can be implemented by an electronic mail service provider, and can be put into communication with a local exchange of the telephone operator in order to obtain the telephone number (or an alias) associated with the IP address assigned to the user terminal (in this case a personal computer).

The EMSC described above can be implemented by using a generic computer comprising a CPU and a memory associated with the CPU. The software for controlling access to the electronic mail services can be implemented, by means of suitable programming code, in one or more computer programs, as will be evident to those skilled in the art.

This software can be made available, for example, in the form of one or more executable files, resident on a medium accessible to the memory of a computer, such as a hard disk or a removable disk, for example a CD-ROM or DVD-ROM, or by means of an external disk accessible by a local network. For the purposes of the present invention, the expression "software program adapted for loading into a memory of a computer" comprises executable files and/or files required for the execution of the executable files, such as library files, initialization files, etc. This expression also comprises a source program of such executable and/or library files. This expression also comprises files which may be different from the executable and/or library files, prepared in the form of installable files, for installing, when executed, the executable files and the library files on a disk accessible by a computer which implements the EMSC. This installable software can be resident on media readable by the memory of a computer, such as diskettes, CD-ROMs or DVD-ROMs, or can be available for downloading from a network disk, for example the Internet.

The invention claimed is:

1. A method for sending an electronic mail message in a communications network, said message comprising a header and a body, said header comprising at least a first field adapted for containing an address of a sender of said message, and a second field adapted for containing an address of a recipient of said message, said sender being a user identified in said communications network by means of a first identifier associated with at least a second identifier, said header further comprising a third field, containing said first identifier of said user, said method comprising the steps of:
    selecting said first identifier of said user from said third field of said header;
    requesting said second identifier associated with said first identifier from at least one apparatus of said communications network;
    including said second identifier in said header of said message; and
    forwarding said message to said recipient;
    said step of including said second identifier in said header comprising including said second identifier in said first field,
    wherein said first field is a sender field of the electronic mail message.

2. The method according to claim 1, wherein said communications network comprises a mobile communications network.

3. The method according to claim 2, wherein said first identifier comprises an IMSI associated with a SIM belonging to said user, said SIM being capable of permitting a connection of said user to said mobile communications network.

4. The method according to claim 2, wherein said apparatus of said communications network comprises a GGSN server of said mobile communications network.

5. The method according to claim 1, wherein said first identifier comprises an IP address assigned to the said user.

6. The method according to claim 1, wherein said first identifier comprises a host name assigned to said user.

7. The method according to claim 1, wherein said second identifier comprises a telephone number of said user.

8. The method according to claim 1, wherein said second identifier comprises a prefixed alias of said user.

9. The method according to claim 1, wherein said step of including said second identifier in said first field comprises replacing a first string included in said field with a second string, said second string comprising said second identifier.

10. A computer readable storage medium capable of being adapted to execute the steps of the method according to claim 1.

11. A method for forwarding a request for access to an electronic mailbox from a user of a communications network, said user being identified in said communications network by means of a first identifier associated with at least a second identifier, said request comprising at least a first field for containing an access key to said mailbox and a second field containing said first identifier of said user, comprising the steps of:
    selecting said first identifier of said user from said second field;
    requesting said second identifier associated with said first identifier from at least one apparatus of said communications network;
    including said second identifier in said first field; and
    forwarding said request for access to said electronic mailbox, using said second identifier included in said first field.

12. An apparatus for sending an electronic mail message in a communications network, said message comprising a header and a body, said header comprising at least a first field adapted for containing an address of a sender of said message, and a second field adapted for containing an address of a recipient of said message, said sender being a user identified in said communications network by means of a first identifier associated with at least a second identifier, said header additionally comprising a third field, containing said first identifier of said user, said apparatus being adapted for:
    selecting said first identifier of said user from said third field of said header;
    requesting said second identifier associated with said first identifier from at least one further apparatus of said communications network;
    including said second identifier in said header of said message; and
    forwarding said message to said recipient,
    said apparatus being adapted to include said second identifier in said first field,
    wherein said first field is a sender field of the electronic mail message.

13. The apparatus according to claim 12, wherein said communications network comprises a mobile communications network.

14. The apparatus according to claim 13, wherein said first identifier comprises an IMSI associated with a SIM belonging to said user, said SIM being capable of permitting a connection of said user to said mobile communications network.

15. The apparatus according to claim 13, comprising a GGSN server of said mobile communications network.

16. The apparatus according to claim 12, wherein said first identifier comprises an IP address assigned to said user.

17. The apparatus according to claim 12, wherein said first identifier comprises a host name assigned to said user.

18. The apparatus according to claim 12, wherein said second identifier comprises a telephone number of said user.

19. The apparatus according to claim 12, wherein said second identifier comprises a prefixed alias of said user.

20. The apparatus according to claim 12, adapted to replace a first string included in said field with a second string, said second string comprising said second identifier.

21. An apparatus for managing requests relating to electronic mail services, said apparatus being adapted to carry out the functions of the apparatus according to claim 12.

22. A communications network comprising a first apparatus according to claim 12, operatively connected to at least a further apparatus on which at least one table is resident comprising said first identifier associated with said second identifier of said user.

23. The communications network according to claim 22, said communications network being adapted for permitting communications from and to a cellular telephone of said user.

24. The communications network according to claim 23, wherein said further apparatus comprises a GGSN server included in said communications network.

25. An apparatus for forwarding a request for access to an electronic mailbox from a user of a communications network, said user being identified in said communications network by means of a first identifier associated with at least a second identifier, said request comprising at least a first field for containing an access key to said mailbox and a second field containing said first identifier of said user, said apparatus being adapted for:

selecting said first identifier of the said user from said second field;

requesting said second identifier associated with said first identifier from at least one further apparatus of said communications network;

including said second identifier in said first field; and forwarding said request for access to said electronic mailbox using said second identifier included in said first field.

* * * * *